United States Patent

[11] 3,632,211

[72] Inventors George F. Sedivy;
William F. Sutterer, both of Rochester, Minn.
[21] Appl. No. 13,672
[22] Filed Feb. 24, 1970
[45] Patented Jan. 4, 1972
[73] Assignee The Waters Company
Rochester, Minn.

[54] METHOD AND APPARATUS UTILIZING ELECTRICAL RESISTANCE RATIOS DERIVED FROM BLOODLESS AND BLOOD DATA FOR DETERMINING THE PERCENTAGE OXYGEN SATURATION IN BLOOD
12 Claims, 3 Drawing Figs.

[52] U.S. Cl. .................................................... 356/41, 250/218
[51] Int. Cl. ..................................................... G01n 33/16

[50] Field of Search ................................. 356/39, 40, 41; 250/218, 226

[56] References Cited
UNITED STATES PATENTS
3,029,682 4/1962 Wood ............................ 356/41
3,066,570 12/1962 Goodman et al. ............. 356/41

Primary Examiner—Ronald L. Wibert
Assistant Examiner—Orville B. Chew, II
Attorney—Dugger, Peterson, Johnson & Westman ABSTRACT: Spectral data is obtained with respect to both bloodless and blood specimens. Signals are derived from this data representative of certain ratios and these signals are processed so as to obtain a direct indication of the percentage oxygen saturation without resorting to logarithmic relationships.

3,632,211

METHOD AND APPARATUS UTILIZING ELECTRICAL RESISTANCE RATIOS DERIVED FROM BLOODLESS AND BLOOD DATA FOR DETERMINING THE PERCENTAGE OXYGEN SATURATION IN BLOOD

BACKGROUND OF THE INVENTION

1. Field of the Invention

This invention relates generally to oximetry, and pertains more particularly to a method and apparatus which will provide a direct indication of the degree of oxygen saturation.

2. Description of the Prior Art

Previous oximeters and procedures have made use of logarithmic ratios for obtaining oxygen saturation independently of hemoglobin. Not only have the measurements proved time consuming, but they have resulted in a considerable scattering of the derived information when graphically plotted. Notable among the prior art oximeters is the apparatus described in U.S. Pat. No. 3,029,682 issued on Apr. 27, 1962 to Earl H. Wood and assigned to Research Corporation of New York, New York. We do not in any way wish to disparage the teachings of the above-identified patent, but it is believed that the present invention is a decided improvement thereover owing to the more direct approach that is made available.

SUMMARY OF THE INVENTION

One important object of the present invention is to provide a method and apparatus for precisely determining the percentage oxygen saturation of blood thereby enabling better diagnostic evaluations where the amount of oxyhemoglobin is a criterion. In this regard, the invention has for an aim the provision of an oximeter having full range accuracy and which affords a direct linear meter readout.

Another object of the invention is to provide an oximeter that will be extremely simple and easily operated by relatively inexperienced medical technicians.

Another object is to provide an oximeter than can rapidly process the derived information so that the percentage oxygen determination can be quickly effected.

Briefly stated, an instrument is herein described that includes a ratio circuit and a variable gain operational amplifier. Spectral transmission data of the type heretofore utilized is employed in the providing of suitable signals that are delivered to the ratio circuit and the operational amplifier, this being done through the agency of several ganged selector switches. Additionally, certain of the data is stored and utilized so that comparative procedures can be employed. The gain of the operational amplifier is used for compensating for the hemoglobin and when employed in conjunction with the difference between ratios derived from bloodless and blood readings provides an accurate output which is indicative of the percentage oxygen saturation.

DESCRIPTION OF THE PREFERRED EMBODIMENT

Figure 1:
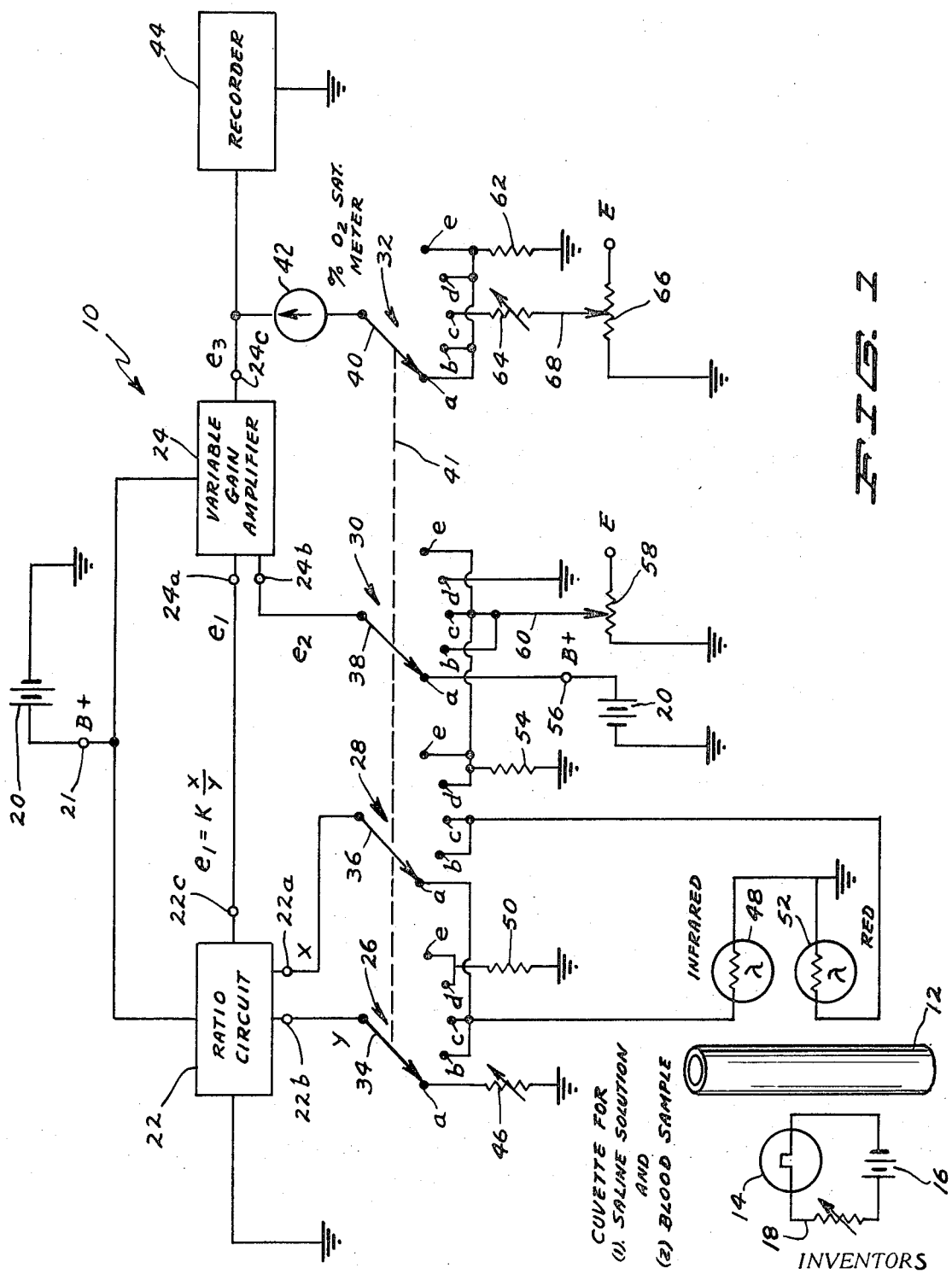
FIG. 1 is a simplified schematic diagram, partially in block form, illustrating one form the circuitry constituting our invention can assume.

Referring first to FIG. 1 the oximeter there depicted shows oximeter circuitry denoted generally by the reference numeral 10. Associated with the circuitry 10 is a cuvette 12 for initially containing a saline solution and thereafter the blood specimen itself. However, the circuitry 10 is not limited to use with the cuvette 12, for it can be employed equally well with a conventional earpiece that obtains the required data directly from the patient without the necessity of removing blood. Both the cuvette and earpiece approaches have been extensively used in the past and this will readily be recognized by those familiar with oxygen saturation determination.

Located so as to direct light through the cuvette 12 is a lamp 14 energized by a battery 16, a variable resistor 18 affording a means for adjusting the light intensity of the lamp 14.

Describing now the circuitry 10, it will be discerned that a voltage supply 20 in the form of battery furnishes an appropriate voltage B+, specifically 15 volts, to a terminal 21 which is in turn connected to a ratio circuit 22 having a pair of input terminals 22a and 22b, as well as an output terminal 22c. As its name implies, the function of the ratio circuit 22 is to provide a division or ratio of the value of a first resistance, when connected to the terminal 22a, to the value of a second resistance, when connected to the terminal 22b, the ratio or quotient appearing as a voltage signal at the output terminal 22c. For the sake of discussion at this stage, it will be merely pointed out that the terminal 22a has a first resistance which will be generally referred to as X connected thereto and the terminal 22B, a second resistance Y, the ratio provided at the output terminal 22c then being X/Y. The various values constituting the X and Y resistances will become clear as the description progresses.

At this time, attention is directed to the presence of an operational amplifier 24 having a variable gain. As with the ratio circuit 22, the operational amplifier 24 is energized by means of a connection from the terminal 21. The amplifier 24 is provided with a pair of input terminals 24a and 24b and also has an output terminal labeled 24c. As with the X and Y resistances, the signals identified as $e_1$ and $e_2$, as well as the output signal $e_3$ representing any difference therebetween, will become better understood hereinafter. The signal $e_1$ is applied to the input terminal 24a and owing to the direct connection of the input terminal 24a to the output terminal 22c it will be appreciated that the signal $e_1$ has a magnitude representative of the ratio X/Y. The signal $e_2$ is of a variable nature and is changed in a manner that will be described more fully later on.

The circuitry 10 additionally includes four selector switches 26, 28, 30 and 32, each equipped with five contacts labeled a, b, c, d and e. The switch 26 has a selector arm 34 engageable with any of the contacts 26a, 26b, 26c, 26d or 26e. The arm 34 is connected directly to the input terminal 22b of the ratio circuit 22. Similarly, the selector switch 28 has an arm 36 that is engageable with any of the contacts 36a, 36b, 36c, 36d and 36e, being in turn connected to the input terminal 22a of the ratio circuit 22. On the other hand, the switch 30 has an arm 38 engageable with any of the contacts 30a, 30b, 30c, 30d and 30e, this particular arm being connected to the input terminal 24b of the operational amplifier 24. The remaining switch 32 includes a selector arm 40 that is likewise engageable with any of the contacts 32a–32e. The several arms 34, 36, 38 and 40 are ganged or mechanically coupled that they move in unison, the ganging thereof being indicated by the dashed line 41.

The circuitry 10 contemplates the employment of a meter 42 for providing a direct reading of the percentage oxygen saturation. This meter is a microammeter and is connected between the arm 40 of the switch 32 and the output terminal 24c of the amplifier 24. Inasmuch as two modes of indication is contemplated, a second exemplary mode is in the form of the recorder 44 which is also connected to the output terminal 24c.

A variable resistor 46 is connected between the contact 26a and ground for the purposes of storing a signal representative of the particular resistance of a photoresistive cell 48 that is sensitive to infrared light energy transmitted through the cuvette 12 from the light source or lamp 14, the resistance decreasing in proportion to the quantum of infrared light energy striking the cell, as is conventional with this type of cell. In the accomplishment of this, the contact 28a of the switch 28 is connected to the cell 48, as are the contacts 26b and 26c of the switch 26. The manner in which this is accomplished will not be understood at this stage of the description, but a detailed explanation thereof will be ultimately given. The contacts 26d and 26e are connected through a fixed resistor 50 to ground. The contacts 28b and 28c of the switch 28 are connected directly to a second photoresistive cell 52 that is responsive to red light passing through the cuvette 12 from the light source or lamp 14. The contacts 28d and 28e are connected to ground through a fixed resistor 54.

The contact 30a is connected to a terminal 56 to which is applied a constant voltage B+ and to avoid showing a conductor running from the source 20 previously referred to, a second battery 20 is illustrated. On the other hand, the contacts 30b and 30c are connected to a potentiometer 58, more specifically to a wiper arm 60 belonging to the potentiometer 58. As with the variable resistor 46, the purpose of the potentiometer 58 is to store certain signal information, more specifically a resistive ratio of the resistances supplied by the cells 52 and 48. The contact 30d is connected directly to ground, and the contact 30e to ground through the previously mentioned resistor 54, as is evident.

The remaining switch 32 has its contacts 32a, 32b, 32d and 32e connected to ground through a fixed resistor 62. The contact 32c, however, is connected through a variable resistor 64 and a potentiometer 66 to ground, the potentiometer 66 having a wiper arm 68 that can be properly positioned. In this regard, the variable resistor 64 is included in the circuitry so that an adjustment can be made for the sensitivity of the meter 42, whereas the potentiometer 66 supplies an offset voltage for use in adjusting the meter 42. Stated somewhat differently, the adjustable resistor 64 and the potentiometer 66 are employed for calibrating the meter 42 so that it will read the actual percentage oxygen saturation.

Figure 2:
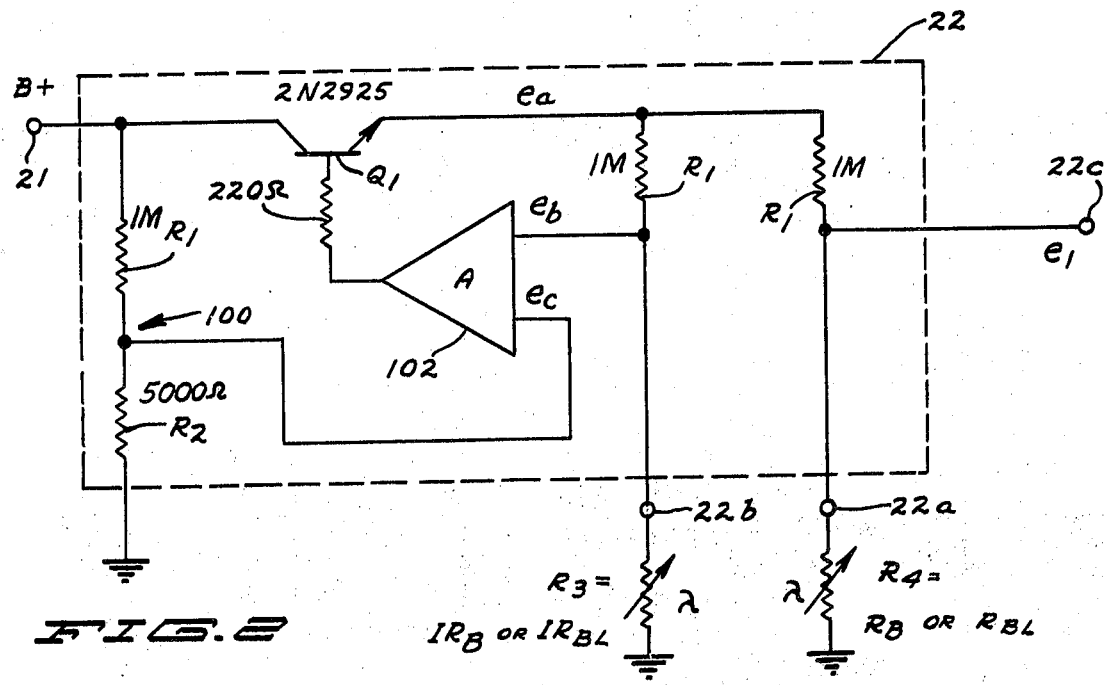
FIG. 2 is detailed schematic diagram of the ratio circuit shown in block form in FIG. 1.

Inasmuch as the ratio circuit 22 plays an important role in the practicing of our invention, particularly in simplifying the overall oximetry circuitry 10, attention is now directed to FIG. 2 where the components constituting this circuit are set forth in sufficient detail so as to illustrate how a voltage signal $e$, representing the previously referred to X/Y ratio is obtained. In the circuit 22 there is included an NPN-transistor $Q_1$ having its collector connected to the terminal 21. A voltage divider 100 comprising resistors $R_1$ and $R_2$ is connected between the terminal 21 and ground. THe juncture of the resistors $R_1$ and $R_2$ of the divider 100 is connected to one input terminal of an operational amplifier 102, such as a Fairchild integrated operational amplifier 709C. An additional resistor $R_1$ is connected between the emitter of the transistor $Q_1$ and the other input terminal of the amplifier 102, as well as to the terminal 22b, whereas the output terminal of the amplifier 102 is connected through a suitable resistance to the base of the transistor $Q_1$. Still a third resistor $R_1$ is connected between the emitter of the transistor $Q_1$ and the terminal 22c of the circuit 22 and to the terminal 22a as well.

Appropriately applied to the circuit 22, as depicted in FIG. 2, are letter designations representing voltages $e_a$, $e_b$ and $e_c$ as well as $e_1$ which appears also in FIG. 1. More specifically $e_b$ will equal $e_c$, for if $e_b$ attempts to increase, the base current in transistor $Q_1$ decreases which in turn raises the $V_{CE}$ of the transistor, thereby reducing $e_a$ and restoring $e_b$ to its original value.

Figure 3:
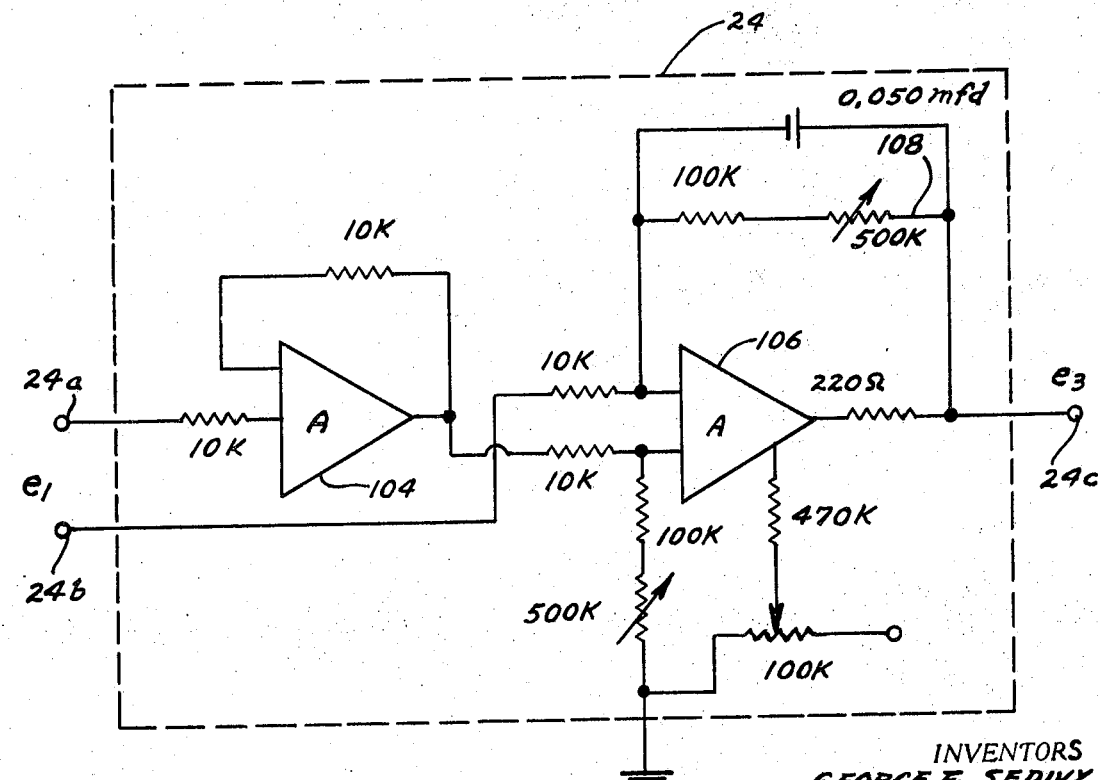
FIG. 3 is a detailed schematic diagram of the amplifier circuit shown in block form in FIG. 1.

Therefore:
1. $e_b = e_a(R_3/R_1)$ where $R_1 >> R_3$
2. $e_c = B+(R_2/R_1)$ where $R_1 >> R_2$
  since $e_b = e_c$:
3. $e_a = B+(R_2/R_1)(R_1/R_3)$
   $= B+(R_2)(1/R_3)$
4. $e_1 = e_a(R_4/R_1)$ where $R_1 >> R_4$
Consequently:
5. $e_1 = B+(R_2)(1/R_3)(R_4/R_1)$
   $= B+(R_2)(1/R_1)(R_4/R_3)$
   $= K(R_4/R_3)$ It will be understood that in the above equations $R_3$ represents the Y resistance (hereinafter also identified as either $IR_B$ or $IR_{BL}$) and that $R_4$ represents the X resistance (hereinafter also identified as either $R_B$ or $R_{BL}$). Although the variable gain amplifier 24 perhaps does not require a detailed description, nonetheless its elements are diagrammatively illustrated in FIG. 3. Actually, the amplifier 24 comprises a first operational amplifier, such as the amplifier 102 contained in the ratio circuit 22, and a similar operational amplifier 106. The amplifier 104 functions as a voltage follower for supplying the proper voltage to one input terminal of the amplifier 106. The adjustable gain for the amplifier 24 is provided through the agency of an adjustable resistor 108. A number of additional components appears in FIG. 3, large to provide proper operating voltages, and need not be specifically referred to, especially since various component values have been applied.

OPERATION

With the foregoing information in mind, it is believed that an operational sequence can now be understood. Accordingly, assuming that the cuvette 12 contains a clear saline solution, the first step is to position the arms 34, 36, 38 and 40 of the switches 26, 29, 30 and 32 so that the "a" contacts thereof are engaged. It will be seen that the arm 34 completes an electrical circuit between the input terminal 22b of the ratio circuit 22 and the variable resistor 46; concomitantly, the arm 36 completes a circuit between the input terminal 22a and the cell 44 which is responsive to the amount or quantity of infrared light impinging thereon. Owing to the fact that the arm 28, due to the ganging of the switch arms together, completes a circuit between the input terminal 24b of the amplifier 24 and the terminal 56 which has applied thereto a fixed potential. By reason of the adjustability of the resistor 46, it can be varied so as to apply a voltage signal to the input terminal 22b that is equal to the signal derived from the cell 48. In so doing, the Y signal is made equal to the X signal and the ratio at the output terminal 22c, that is X/Y, will be equal to unity.

With a voltage corresponding to unity applied to the terminal 56, it follows that the signals $e_1$ and $e_2$ will equal each other with the consequence that the signal $e_3$ will be zero. Such a condition is readily ascertained by observing the meter reading at 42, for when the meter goes to 100 percent or electrical zero, such a condition is known to have been realized. In other words, the resistive value of the resistor 46 is made equal to the same resistance of the infrared photocell 48. Also, by adjusting the variable resistor 46 so that the value thereof corresponds to that of the infrared cell 48 with saline solution in the cuvette 12, the resistor 46 actually stores the appropriate value and subsequent use is made of this in the processing of the operational data.

The second step involves the shifting of the various arms 34, 36, 38 and 40 so that they engage their respective "b" contacts. The arm 34 is then connected in circuit with the infrared photocell 48, whereas the arm 36 instead is connected in circuit with the red photocell 52. Simultaneously with this happening is the fact that the arm 38 is connected in circuit with the potentiometer 58. What is occuring is that signals are impressed on the input terminals 22a and 22b that are, respectively, in accordance with the red resistance and the infrared resistance of the cells 52 and 48. Thus, the X/Y ratio at the output terminal 22c represents the ratio of these two resistances and under these circumstances constitutes the signal $e_1$ delivered to the input ut terminal a of the operational amplifier 24. By making the signal $e_2$ equal to the signal $e_1$, the output signal is zero. This is accomplished by moving the wiper arm 60 so that the potentiometer 58 provides an $e_2$ signal equal to the $e_1$ signal, the balancing out of these two signals being readily perceived by looking at the meter 42 as was done in the first step. The potentiometer 58 in this way stores the ratio of the red resistance with respect to the infrared resistance as determined with saline solution present in the cuvette 12.

The third step involves substituting blood for the saline solution in the cuvette 12. When this is completed, the switch arms 34, 36, 38 and 40 are returned to the "a" contacts of the switches 26, 28, 30 and 32. It will be recalled that a signal has been stored in the variable resistor 46 corresponding to the bloodless infrared resistance that was determined when the cuvette 12 contained the saline solution. The resistor 46 is not changed at this point. On the other hand, since the arm 36 of the switch 38 is now in circuit with the cell 48 which is receiving light energy in the infrared portion of the spectrum, its resistance is influenced by the presence of blood in the cuvette 12 rather than the clear saline solution. Consequently, due to the decrease in light energy received by the cell 48, its resistive value will be greater. Thus, the X/Y ratio signal at the output terminal 22c will be different because it will then represent the ratio of the infrared resistance for blood with respect to the infrared resistance for the saline solution because the Y signal is still in accordance with the original saline solution balancing that was accomplished. HOwever, the arm 38 is again in engagement with contact 30a and impresses the unit voltage signal onto the input terminal 24b of the operational amplifier 24. Hence, the difference between the signal $e_1$ and the signal $e_2$ under these conditions is reflected in the value of the signal $e_3$ and the meter 42 immediately informs the viewer of the degree of difference. Stated somewhat differently, the ratio of X to Y represents the ratio of the infrared resistance of the cell 48 with blood in the cuvette 12 to the infrared resistance of this cell with saline solution in the cuvette. By then adjusting the gain of the amplifier 24 doing so by means of the adjustable resistor 108 (FIG. 3) so that the meter 22 reads 0 percent saturation, which is when it is completely to the right-hand side, compensation is effected for hemoglobin.

The next step, with blood still flowing through the cuvette, is to shift the arms 24, 36, 38 and 40 so that they engage the "b" contacts of the various switches 26, 28, 30 and 32. Quite obviously, this makes the first resistance X applied to the input terminal 22a representative of the resistance of the cell 52 which in turn is indicative of the amount of red light transmitted through cuvette 12 with blood therein. The Y resistance on the other hand, is representative of the amount of infrared resistance of the cell 48 and the resulting ratio signal of X/Y at the output terminal 22c of the ratio circuit 22 is in accordance with the ratio of the signals at the input terminals 22a and 22b. Inasmuch as the signal $e_1$ now represents the new X/Y ratio, the input terminal 24a of the amplifier 24 receives such a signal and it is compared with the signal arriving via the input terminal 24b which is the $e_2$ signal. It will be recalled that the wiper arm 60 of the potentiometer 58 was previously positioned so that a signal representative of the ratio of the red bloodless resistance to the infrared bloodless resistance was stored. Consequently, the new output signal $e_3$ reflects whatever difference there is between these two signals and forwards this signal information to the meter 42. Whatever shift in the meter reading takes place is then representative or indicative of the percentage oxygen saturation of the blood passing through the cuvette 12.

To effect the proper reading of the meter 42, however, the switch arms 34, 36, 38 and 40 are moved to the contacts "c." This is the reading position of the various switches 26, 28, 30 and 32. Inasmuch as the contacts b and c of the switches 26, 28 and 30 are joined together, there is no change in the signal information carried via these contacts. However, as for as the contact c of the switch 32 is concerned, it being in series with the variable resistor 64 in the potentiometer 66, the actual reading displayed on the meter 42 will be influenced by the setting of the variable resistor 64 and the wiper arm 68 of the potentiometer 66. As already indicated, these components 64 and 66 are for compensating purposes. To properly adjust the parameters of these two components, it is necessary to pass blood through the cuvette 12 having a known percentage oxygen saturation. Preferably, two samples would be employed, one having a high and one having a low degree of oxygen saturation. WIth the meter then initially calibrated, the reading on the meter 42 under the present set of circumstances will result in an accurate indication of the percentage oxygen saturation for the particular blood specimen for which an analysis is desired. Of course, it will be appreciated that the d and e contacts of the several switches 26, 28, 30 and 32 are only used in the initial setting and thereafter need not be engaged in succeeding determinations.

By way of facile recapitulation, it might be well to present a mathematical interpretation of what transpires:

1. Switches 26–32 set on "a" contacts for bloodless reading:
$e_1 = K_1$ (1)
    where $X$ input $= IR_{BL}$ and $Y$ input $= IR_{BL}$ on adjustable resistor 46
$e_2 = K_1$
$e_3 = (e_1 - e_2)$ gain $= 0$ 2. Switches 26–32 set on "b" contacts for bloodless reading:
$e_1 = K_1(R_{BL}/IR_{BL})$
    where $X$ input $= R_{BL}$ and $Y$ input $= IR_{BL}$
$e_2 = K_1(R_{BL}/IR_{BL})$ for potentiometer 58 setting
$e_3 = 0$ 3. Switches 26–32 set on "a" contacts for blood reading:
$e_1 = K_1(IR_B1IR_{BL})$
    where $X$ input $= IR_B$ and $Y$ input $= IR_{BL}$ (potentiometer 58 setting)
$e_1 = K_1$
$e_3 = K_2 = K_1(IR_B/R_{BL} - 1)$ gain
gain $= K_2/K_1 \cdot 1/(IR_{BL}/IR_{BL} - 1)$ 4. Switches 26–32 set on "b" contacts for blood reading:
$e_1 = K_1(R_B/IR_b)$
    where $X$ input $= R_B$ and $Y$ input $= IR_B$
$e_2 = K_1(R_{BL}/IR_{BL})$ for potentiometer 58 setting
$e_1 = (e_1 - e_2)$ gain
$e_3 = K_2(R_B/IR_B - R_{BL}/IR_{BL})/(IR_B/IR_{BL} - 1)$ In the above (1), (2), (3) and (4):
$R_B$ = red photocell blood resistance
$R_{BL}$ = red photocell bloodless resistance Also it should be recognized that:
$(IR_B/IR_{BL} - 1)$ is proportional to hemoglobin The oximetric system 10 herein disclosed is self-balancing by virtue of the fact that the two photocells 48 and 52 are connected to the ratio circuit 22. As explained, both photocells 48 and 52 are connected in the ratio circuit 22 so that a change in the blood condition during procedure that is common to both cells 48, 52 is acted on by the ratio circuit 22 with the result that the system is readjusted automatically. Hence, the system is therefore sensitive only to oxygen saturation changes and does not respond to various nonspecific changes occuring in the blood sample undergoing analysis.

We claim:

1. A method of determining the amount of oxygen saturation in a blood sample comprising the steps of deriving a signal in accordance with the difference between a first ratio of resistance representative of the amount of red light passing through the blood sample with respect to resistance representative of the amount of infrared light passing through said blood sample and a second ratio of resistance representative of the amount of red light passing through a bloodless sample with respect to resistance representative of the amount of infrared light passing through said bloodless sample, providing another signal in accordance with the ratio of said resistance which is representative of the amount of infrared light passing through said blood sample to said resistance which is representative of the amount of infrared light passing through said bloodless sample minus a constant substantially equal to one, and providing an output signal in accordance with the ratio of said two signals to provide an indication of the percentage oxygen saturation in the blood from which said first two resistances have been determined.

2. A method of providing an indication of the amount of oxygen saturation in a blood sample comprising the steps of passing light through a bloodless sample onto a photoresistive means responsive to infrared light whereby the resistance thereof represents the amount of infrared light transmitted through said bloodless sample, adjusting a variable resistor so that its resistance corresponds to that of said infrared responsive means, passing said light through said bloodless sample onto a photoresistive means responsive to red light whereby the resistance thereof represents the amount of red light transmitted through said bloodless sample, deriving a signal representative of the ratio of said last two resistances which has a value of substantially one owing to the general correspondence of said resistances, comparing said ratio signal with a known signal having a value of substantially one to provide a signal representative of the difference therebetween having a value of substantially zero and thereby establishing a base level for making the oxygen saturation determination, passing said light through a blood sample onto said infrared responsive means so that the resistance thereof then represents the amount of infrared light transmitted through said blood sample, passing said light through said blood sample onto said photoresistive means responsive to red light whereby the resistance thereof represents the amount of red light transmitted through said blood sample, deriving a signal representative of the ratio of said last-mentioned red resistance with respect to said last-mentioned infrared resistance, and comparing said last-mentioned ratio signal with said first-mentioned ratio signal to obtain a signal which is an indication of the amount of difference between said ratio signals and which is an indication of the amount of oxygen saturation in said blood.

3. An oximeter for determining the amount of oxygen saturation in a blood sample comprising a circuit having first and second input terminals and an output terminal for providing a voltage at its output terminal which represents the ratio of the value of a first resistance when connected to its first input terminal with respect to a second resistance when connected to its second input terminal so that, when said first resistance corresponds to the value of the red photocell blood resistance of said sample and the second resistance corresponds to the value of the infrared photocell blood resistance of said sample, said voltage at said output terminal represents the ratio of said red photocell blood resistance to said infrared photocell blood resistance, means for comparing the voltage at said output terminal with a second voltage to provide a third voltage in accordance with any difference therebetween so that said third voltage is indicative of the amount of oxygen saturation of the blood when said second voltage represents the ratio of red photocell bloodless resistance to infrared photocell bloodless resistance.

4. An oximeter in accordance with claim 3 including potentiometer means for providing said second voltage having a value representative of the ratio of red photocell bloodless resistance to infrared photocell bloodless resistance.

5. An oximeter in accordance with claim 4 including adjustable resistance means connectable to the said second input terminal so that when a resistance corresponding to the infrared photocell bloodless resistance is connected to the first input terminal and the value of said adjustable resistance means varied so that the voltage at said output terminal has a unitary value then said adjustable resistance means provides a stored resistance corresponding to said infrared bloodless resistance, and means for applying a fourth voltage having a unitary value to said comparing means so that when the difference between the voltages being compared is substantially zero then said potentiometer means can be adjusted to store the voltage value which is representative of the ratio of red photocell bloodless resistance to infrared photocell bloodless resistance.

6. An oximeter in accordance with claim 5 in which said comparing means includes an adjustable gain operational amplifier means having a first input terminal connected to the output terminal of said ratio circuit, a ground terminal connectable to said potentiometer means, and an output terminal for providing said third voltage.

7. An oximeter in accordance with claim 6 including a meter connected to the output terminal of said amplifier means for measuring the magnitude of said third voltage.

8. An oximeter in accordance with claim 7 including first, second, third and fourth selector switches each having first, second and third contacts and each having a selector arm mechanically coupled to the selector arms of the other selector switches, the arm of said first selector switch being connected to the second input terminal of said ratio circuit and the first contact of said first selector switch being connected to said adjustable resistance means, a photocell whose resistance varies inversely with the amount of infrared light impinging thereon, said second and third contacts of said first selector switch being connected to said infrared photocell, the selector arm of said second switch being connected to the first input terminal of said ratio circuit, a photocell whose resistance varies inversely with the amount of red light impinging thereon, said second and third contacts being connected to said red photocell, the selector arm of said third switch being connected to said second input terminal of said operational amplifier, a unitary voltage source means, the first contact of said third switch being connected to said voltage source means and the second and third contacts of said third switch being connected to said potentiometer means, the selector arm of said fourth switch being connected to said meter, the first and second contacts of said fourth switch being connected in circuit with said source means, and the third contact of said fourth switch being connected in circuit with said source means.

9. An oximeter in accordance with claim 8 including an additional adjustable resistance means for adjusting the sensitivity of said meter and an additional potentiometer means for providing an offset voltage, said additional adjustable resistance means and said additional potentiometer means being connected in circuit between the third contact of said fourth switch and said source means.

10. Apparatus for determining the amount of oxygen saturation in blood comprising a light source, a ratio circuit having first and second input terminals and an output terminal for providing an output signal representative of the ratio of signals applied to said input terminals, means for applying a first input signal to said first input terminal representative of the amount of infrared light transmitted through a saline solution from said light source, first adjustable storage means for applying a second input signal to said second input terminal having a predetermined relation to said infrared signal so that the output signal at said output terminal represents a desired ratio, means providing a reference signal having a predetermined relation to the output signal from said ratio circuit and hence having a predetermined relation with respect to said desired ratio, differential amplifier means having first and second input terminals and an output terminal for providing an output signal representative of any algebraic difference between signals applied to its said input terminals, the output terminal of said differential amplifier means providing a second output signal having a desired relation to any difference between the values of said first output signal and said reference signal, means for applying a third input signal to the first input terminal of said ratio circuit representative of the amount of red light transmitted through a sample of blood from said light source, means for applying a fourth input signal to said second input terminal of said ratio circuit representative of the amount of infrared light transmitted through said blood sample from said source whereby a third output signal is provided at the output terminal of said ratio signal which represents the ratio of said third and fourth signals with respect to each other, second adjustable storage means for applying a fifth input signal to the second input terminal of said differential amplifier means having a predetermined relation to said third output signal from said ratio circuit so that said fifth input signal represents the ratio of said third and fourth signals whereby a fourth output signal is provided at the output terminal of said differential amplifier means having a relation indicative of the change in the value of said fourth output signal from said second output signal, said fourth output signal being proportional to the oxygen saturation of said blood sample.

11. Apparatus for determining the amount of oxygen saturation in blood comprising a light source, a first photoelectric cell whose resistance varies inversely with respect to the intensity of infrared light impinging thereon, a second photoelectric cell whose resistance varies inversely with respect to the intensity of red light impinging thereon, ratio circuit means having first and second input terminals and an output terminal, variable gain operational amplifier means having first and second input terminals and an output terminal, an electrical meter connected to the last-mentioned output terminal, means for connecting the first input terminal of said ratio circuit means to said infrared responsive photocell, an adjustable resistor, means for connecting the second input terminal of said ratio circuit means to said adjustable resistor so that said adjustable resistor can be varied to correspond to the particular resistance of said infrared photocell and thereby store the value of said infrared resistance when light from said source is passing through a saline solution, said ratio circuit means then providing an output signal at its said output terminal representative of unity, means for concurrently applying a signal corresponding to said ratio signal of unity to the second input terminal of said operational amplifier means so as to provide a zero output signal at its said output terminal, said meter indicating when the adjustment of said adjustable resistor has produced said zero output signal, means for connecting the first input terminal of said ratio circuit means to said red photoelectric cell, means for connecting the second input terminal of said ratio circuit means to said input terminal of said ratio circuit means so that the output signal at the output terminal of said ratio circuit means then represents the ratio of the red resistance to infrared resistance when a saline solution is passing between said light source and said photocells, a potentiometer, means for connecting the second input terminal of said operational amplifier means to said potentiometer so that the signal applied to the second input terminal of said operational amplifier means can be adjusted to equal the output signal from the output terminal of said ratio circuit means to again provide a zero output signal at the output terminal of said operational amplifier means, said potentiometer recording a resistive value corresponding to the ratio of red to infrared resistive value corresponding to the ratio of red to infrared resistances as determined by said photocells whereby a ratio signal can thereafter be provided which represents the ratio of the resistance of said infrared cell to the value stored on said adjustable resistor and any difference between said ratio signal and said unity signal applied to the second input terminal of said operational amplifier means will provide an output signal at the output terminal of said operational amplifier means which can be reduced to a predetermined level by controlling the gain of said operational amplifier means as observed by the reading of said meter and thereafter a ratio signal provided by said ratio circuit means which represents the ratio of the red resistance to infrared resistance when blood is passing between the light source and said photocells and any difference between said last-mentioned ratio signal and the stored ratio signal on said potentiometer providing an output signal at said output terminal of the operational amplifier means which causes said meter to indicate the percentage of oxygen saturation.

12. Apparatus for determining the amount of oxygen saturation in blood comprising first means responsive to light energy in the infrared portion of the light spectrum, second means responsive to light energy in the red portion of the light spectrum, first, second, third and fourth switches each having first, second and third contacts and each having a selector arm, adjustable resistance means connected in circuit with the first contact of said first switch, said second and third contacts of said first switch and said first contact of said second switch being connected in circuit with said first light responsive means whereby said adjustable resistance means can be adjusted to apply an electrical signal to the first contact of said first switch corresponding to the value of the electrical signal being applied to said first contact of said second switch means, a ratio circuit having first and second input terminals and an output terminal, said first input terminal being connected to the arm of said first switch, said second input terminal being connected to the arm of said second switch and said output terminal providing an output signal representing the ratio of the resistances in circuit with the first contacts of said first and second switches, means in circuit with the first contact of said first and second switches, means in circuit with the first contact of said third switch for applying an electrical signal of constant value to the first contact of said third switch, an operational amplifier means having first and second input terminals and an output terminal, said first input terminal of said operational amplifier means being connected to the output terminal of said ratio circuit, said second input terminal of said operational amplifier means being connected to the first contact of said first switch and said output terminal of said operational amplifier means providing an output signal representative of any difference between the electrical signals applied to the first and second input terminals thereof, a potentiometer having an adjustable wiper arm, the second and third contacts of said second switch being connected to said second light responsive means and said second and third contacts of said third switch being connected in circuit with said wiper arm so as to store an electrical signal corresponding to the ratio of the resistive signals applied to the second contacts of said first and second switches by said second and first light responsive means when the arms of said second and first switches are engaged with the second contacts of said second and first switches, and measuring means connected between the output terminal of said operational amplifier means and the arm of said fourth switch, said first and second contacts of said fourth switch being connected in circuit with the power supply for said ratio circuit and said operational amplifier, second adjustable resistance means, a second potentiometer having a wiper arm, said second adjustable resistance means and said second wiper arm being connected in series with the third contact of said fourth switch.

* * * * *

UNITED STATES PATENT OFFICE
CERTIFICATE OF CORRECTION

Patent No. 3,632,211     Dated January 4, 1972

Inventor(s) George F. Sedivy, et al

It is certified that error appears in the above-identified patent and that said Letters Patent are hereby corrected as shown below:

Col. 3, line 40, "THe" should be --The--. Col. 4, line 60, "ut" should be deleted and "a" should be changed to read --24a--. Col. 5, line 13, "HOwever" should be --However--; line 70, "WIth" should be --With--. Col. 6, line 17, "($IR_B$ I/$R_{BL}$)" should be --($IR_B$/$IR_{BL}$); line 20, "$e_1=K_1$" should be --$e_2=K_1$--; line 21, "($IR_B IR_{BL}-1$)" should be --($IR_B/IR_{BL}-1$)--; line 24, "($R_B/IR_b$)" should be --($R_B/IR_B$)--; line 27, "$e_1$" (first occurrence), should be --$e_3$--.

Signed and sealed this 13th day of June 1972.

(SEAL)
Attest:

EDWARD M. FLETCHER, JR.
Attesting Officer

ROBERT GOTTSCHALK
Commissioner of Patents